(12) United States Patent
Ito et al.

(10) Patent No.: US 7,164,235 B2
(45) Date of Patent: Jan. 16, 2007

(54) VEHICULAR LAMP

(75) Inventors: Masayasu Ito, Shizuoka-ken (JP); Hitoshi Takeda, Shizuoka-ken (JP)

(73) Assignee: Koito Manufacturing Co., Ltd, Tokyo (JP)

( * ) Notice: Subject to any disclaimer, the term of this patent is extended or adjusted under 35 U.S.C. 154(b) by 86 days.

(21) Appl. No.: 10/832,065

(22) Filed: Apr. 26, 2004

(65) Prior Publication Data

US 2004/0212310 A1    Oct. 28, 2004

(30) Foreign Application Priority Data

Apr. 28, 2003    (JP)    ............... 2003-123469

(51) Int. Cl.
*B60Q 1/02*    (2006.01)
(52) U.S. Cl. ................. 315/82; 315/200 R; 315/209 R
(58) Field of Classification Search .................. 315/82, 315/85, 200 R, 209 R, 291, 307, DIG. 5
See application file for complete search history.

(56) References Cited

U.S. PATENT DOCUMENTS

| 5,498,933 | A | * | 3/1996 | Nakamura | .................... 315/205 |
| 5,666,028 | A | * | 9/1997 | Bechtel et al. | ................. 315/82 |
| 6,288,497 | B1 | | 9/2001 | Chang et al. | |
| 6,417,624 | B1 | * | 7/2002 | Ito et al. | ......... 315/88 |
| 6,750,620 | B1 | * | 6/2004 | Suzuki | ........ 315/291 |

FOREIGN PATENT DOCUMENTS

| DE | 295 15 223 U1 | 11/1995 |
| DE | 102 14 423 A1 | 10/2003 |
| JP | 10-217851 | 8/1998 |
| WO | WO-99/39319 | 8/1999 |

OTHER PUBLICATIONS

Patent Abstracts of Japan; Publication No. 10-217851 dated Aug. 18, 1998 (1 pg.).
Official Action of the German Patent and Trademark Office dated Jan. 5, 2006 with English Translation (11 pages).

* cited by examiner

*Primary Examiner*—Tuyet Vo
*Assistant Examiner*—Jimmy Vu
(74) *Attorney, Agent, or Firm*—Osha Liang LLP

(57) ABSTRACT

A vehicular lamp, including: a plurality of semiconductor light emitting devices connected in parallel; a plurality of current limiting units provided corresponding to the plurality of semiconductor light emitting devices, wherein the plurality of current limiting units connect with the corresponding semiconductor light emitting devices respectively in series, and limit electric current flowing through the corresponding semiconductor light emitting devices respectively; and a current control unit for changing electric current to be supplied to at least one of the plurality of semiconductor light emitting devices. When a wire of one of the plurality of semiconductor light emitting devices is broken, the current control unit increases the electric current to be supplied to at least one of the plurality of semiconductor light emitting devices of which a wire is not broken by causing at least a part of the electric current to flow via a path connected in parallel with corresponding one(s) of the plurality of current limiting units.

16 Claims, 9 Drawing Sheets

VEHICULAR LAMP

The present application claims priority from a Japanese Patent Application No. 2003-123469 filed on Apr. 28, 2003, the contents of which are incorporated herein by reference.

BACKGROUND OF THE INVENTION

1. Field of the Invention

The present invention relates to a vehicular lamp. More particularly, the present invention relates to a headlamp, a stop lamp, a tail lamp, a turn lamp, and the like used for a vehicle including automobiles, motorcycles and trains.

2. Related Art

An apparatus for detecting wire breakage of a vehicular lamp and for warning a driver of the wire breakage is known (e.g., Japanese Patent Laid-Open No. 10-217851 bulletin (page 2–4, FIG. 1-3)), thereby the driver is warned to replace the wire-broken light source.

However, when a wire of a light source of the vehicular lamp is broken, the light source stop emitting light and consequently the quantity of light of the vehicular lamp lowered until the wire-broken light source is replaced.

SUMMARY OF THE INVENTION

Therefore, it is an object of the present invention to provide a vehicular lamp, which is capable of overcoming the above drawbacks accompanying the conventional art. The above and other objects can be achieved by combinations described in the independent claim. The dependent claims define further advantageous and exemplary combinations of the present invention.

According to the aspect of the present invention, there is provided a vehicular lamp, including: a plurality of semiconductor light emitting devices connected in parallel; a plurality of current limiting units provided corresponding to the plurality of semiconductor light emitting devices, wherein the plurality of current limiting units connect with the corresponding semiconductor light emitting devices respectively in series, and limit electric current flowing through the corresponding semiconductor light emitting devices respectively; and a current control unit for changing electric current to be supplied to at least one of the plurality of semiconductor light emitting devices; wherein when a wire of one of the plurality of semiconductor light emitting devices is broken, the current control unit increases the electric current to be supplied to at least one of the plurality of semiconductor light emitting devices of which a wire is not broken by causing at least a part of the electric current to flow via a path connected in parallel with corresponding one(s) of the plurality of current limiting units.

The current control unit may include: a plurality of switches respectively connecting with the plurality of current limiting units in parallel and with the plurality of semiconductor light emitting devices in series, each of the plurality of switches electrically connecting both terminals of corresponding one of the plurality of current limiting units when the switch is turned ON; and a switching unit for detecting wire breakage of at least one of the plurality of semiconductor light emitting devices. When the switching unit detects wire breakage of one of the plurality of semiconductor light emitting devices, the switching unit may turn ON at least one of the plurality of switches corresponding to at least one of the plurality of semiconductor light emitting devices of which a wire is not broken.

Each of the plurality of switches may include a transistor, a collector terminal and an emitter terminal of the transistor connecting with both terminals of corresponding one of the plurality of current limiting units, respectively.

Electric resistance of one of the plurality of switches may be higher than that of corresponding one of the plurality of current limiting units.

The electric resistance of the one of the plurality of switches may be substantially 2.5 times as high as that of corresponding one of the plurality of current limiting units.

The plurality of current limiting units may include a plurality of series resistances respectively connecting with the plurality of semiconductor light emitting devices in series so that at least a part of the electric current to be supplied to each of the plurality of semiconductor light emitting devices flows through corresponding one of the plurality of series resistances, each of the plurality of series resistances may include a terminal located closest to corresponding one of the plurality of semiconductor light emitting devices, the current control unit may include a terminal connecting unit connecting the plurality of terminals with one another.

The vehicular lamp may further include a plurality of lamp bodies accommodating therein the plurality of semiconductor light emitting devices and the plurality of series resistances. Each of the plurality of lamp bodies may accommodate a part of the plurality of semiconductor light emitting devices and corresponding one(s) of the plurality of series resistances, and the terminal connecting unit may include a plurality of connection resistors connected in series, the plurality of connection resistors being accommodated in the plurality of lamp bodies and electrically connecting the plurality of terminals of the plurality of series resistances.

Each of the plurality of lamp bodies may include a circuit unit connecting with at least one of the plurality of semiconductor light emitting devices, the circuit unit including a part of the plurality of series resistances.

The circuit unit may be accommodated inside each one of the plurality of lamp bodies.

The circuit unit may further include the current control unit.

The vehicular lamp may further include a circuit unit connecting with the plurality of semiconductor light emitting devices, the circuit unit including the plurality of series resistances and the current control unit.

The plurality of series resistances may respectively include: a plurality of first series resistances, each of the plurality of first series resistances includes a first terminal located closest to high voltage side of corresponding one of the plurality of semiconductor light emitting devices; and a plurality of second series resistances, each of the plurality of second series resistances includes a second terminal located closest to low voltage side corresponding one of the plurality of semiconductor light emitting devices. The current control unit may include: a first terminal connecting unit electrically connecting the plurality of first terminals of the plurality of first series resistances with one another; and a second terminal connecting unit electrically connecting the plurality of second terminals of the plurality of second series resistances with one another, the vehicular lamp may act as at least one of a stop lamp and a tail lamp depending on an instruction from outside, the plurality of light emitting devices may receive electric power from outside of the vehicular lamp via either of the first series resistances or the second series resistances when the vehicular lamp acts as a stop lamp, and the plurality of light emitting devices may receive electric power from outside of the vehicular lamp via both of the first series resistances and the second series resistances when the vehicular lamp acts as a tail lamp.

Electric resistance of the first terminal connecting unit may be higher than that of one of the plurality of first series resistances, and electric resistance of the second terminal connecting unit may be higher than that of one of the plurality of second series resistances.

The electric resistance of the first terminal connecting unit may be substantially 1.5 times as high as that of the one of the plurality of first series resistance, and the electric resistance of the second terminal connecting unit may be substantially 1.5 times as high as that of the one of the plurality of second series resistance.

Each of the plurality of current limiting units may connect with corresponding one of the plurality of semiconductor light emitting devices in series, each of the plurality of current limiting units may include a first series resistance and a second series resistance connected in series, at least a part of the electric current, which is to be supplied to the corresponding one of the plurality of semiconductor light emitting devices, flowing through at least one of the first series resistance and the second series resistance, the vehicular lamp may act as at least one of a stop lamp and a tail lamp depending on an instruction from outside, the plurality of light emitting devices may receive electric power from outside of the vehicular lamp via either of the first series resistances or the second series resistances when the vehicular lamp acts as a stop lamp, and the plurality of light emitting devices may receive electric power from outside of the vehicular lamp via both of the first series resistances and the second series resistances when the vehicular lamp acts as a tail lamp.

The current control unit may include: a first switch connecting with the first series resistance in parallel and with the corresponding one of the plurality of semiconductor light emitting devices in series, the first switch electrically connecting both terminals of the first series resistance when the first switch is turned ON; a second switch connecting with the second series resistance in parallel and with the corresponding one of the plurality of semiconductor light emitting devices in series, the second switch electrically connecting both terminals of the second series resistance when the second switch is turned ON; and a switching unit for detecting wire breakage of at least one of the plurality of semiconductor light emitting devices, and when the switching unit detects wire breakage of one of the plurality of semiconductor light emitting devices, the switching unit may turn ON at least one of the first switch and the second switch corresponding to one of the plurality of semiconductor light emitting devices of which a wire is not broken.

Electric current flowing through each of the plurality semiconductor light emitting devices, when no wire of the plurality of semiconductor light emitting devices is broken, may be lower than rated electric current of each of the plurality of semiconductor light emitting devices.

The electric current flowing through each of the plurality semiconductor light emitting devices, when no wire of the plurality of semiconductor light emitting devices is broken, may be 60–70 percent of the rated electric current of each of the plurality of semiconductor light emitting devices.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
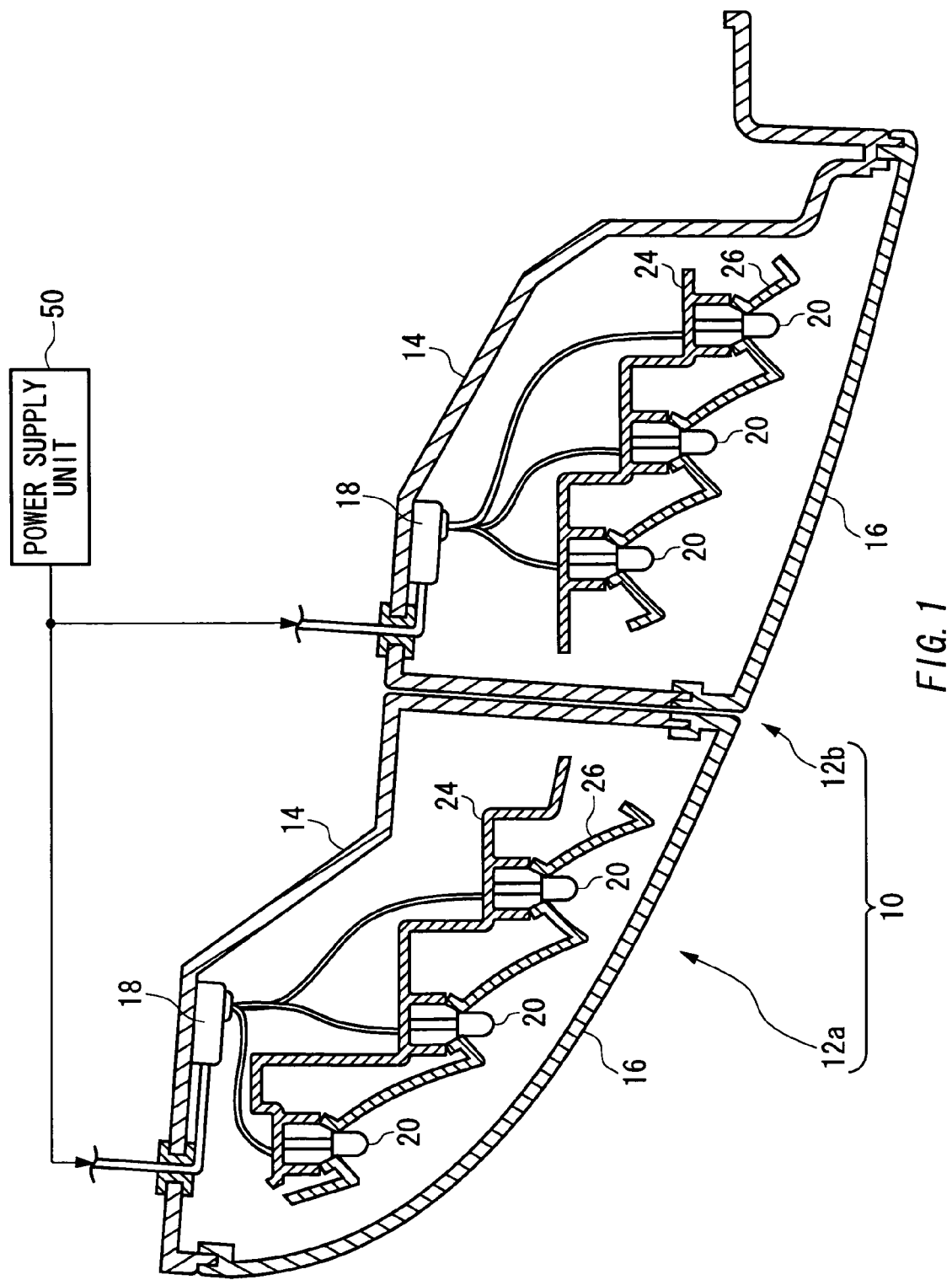
FIG. 1 is a schematic diagram of a vehicular lamp 10 according to one embodiment of the present invention.

FIG. 1 is a schematic diagram of a vehicular lamp 10 with a power supply unit 50 according to one embodiment of the present invention. The purpose of the present embodiment is to provide the vehicular lamp 10 which emits sufficient quantity of light. For example, the vehicular lamp 10 is a part of a rear combination lamp (RCL) which is employed to a motor vehicle, the RCL including a plurality of marker lamps 12a and 12b which are adjoined mutually. For example, each of the marker lamps 12a and 12b is a stop lamp, a tail lamp, or the like, and it includes a circuit unit 18, a plurality of light emitting diodes 20, a support member 24, a reflecting mirror 26, a cover 16, and a lamp body 14.

For examples, the circuit unit 18 is a module including the lighting circuit which causes the plurality of light emitting diodes 20 to emit light, and supplies electric power received from the power supply unit 50 to the plurality of light emitting diodes 20. The light emitting diodes 20 are examples of semiconductor light emitting devices, and they receive the electric power from the circuit unit 18 and emit red or amber light to comply with a requirement of the vehicular lamp 10.

The support member 24 supports the plurality of light emitting diodes 20 so that the plurality of light emitting diodes 20 is oriented to a predetermined direction. The support member 24 may also act as a radiator to radiate heat generated by the light emitting diodes 20. The reflecting mirror 26 reflects the light generated by the light emitting diodes 20 opposite to a traveling direction of the vehicle.

For example, the cover 16 is transparent and covers the plurality of light emitting diodes 20 at the rear of the vehicle. The lamp body 14 faces the cover 16 across the plurality of light emitting diodes 20, so that the plurality of light emitting diodes 20 are covered with the lamp body 14 and the cover 16. Thereby, the lamp body 14 accommodates the plurality of light emitting diodes 20 and the circuit unit 18 so that they are protected from water, debris and the like. The lamp body 14 may be integrated with the body of the vehicles. According to the present embodiment, the vehicular lamp 10 operates properly.

In addition, the power supply unit 50 supplies electric power received from a battery of the vehicle to the vehicular lamp 10 when the vehicular lamp 10 is ON. The plurality of marker lamps 12a and 12b may include the same or similar configuration as/to each other. That is, the plurality of marker lamps have identical design. Moreover, a plurality of vehicular lamps 10 may be provided on the right side and left side of a rear panel of the vehicle. In this case, the vehicle include four marker lamps, which have the same or similar function as/to one another, wherein two of them is provided on the right side while the others on the left. Alternatively, the vehicular lamp 10 includes single marker lamp. Alternatively, the vehicular lamp 10 is used for lighting equipment for a vehicle such as a headlamp.

Figure 2:
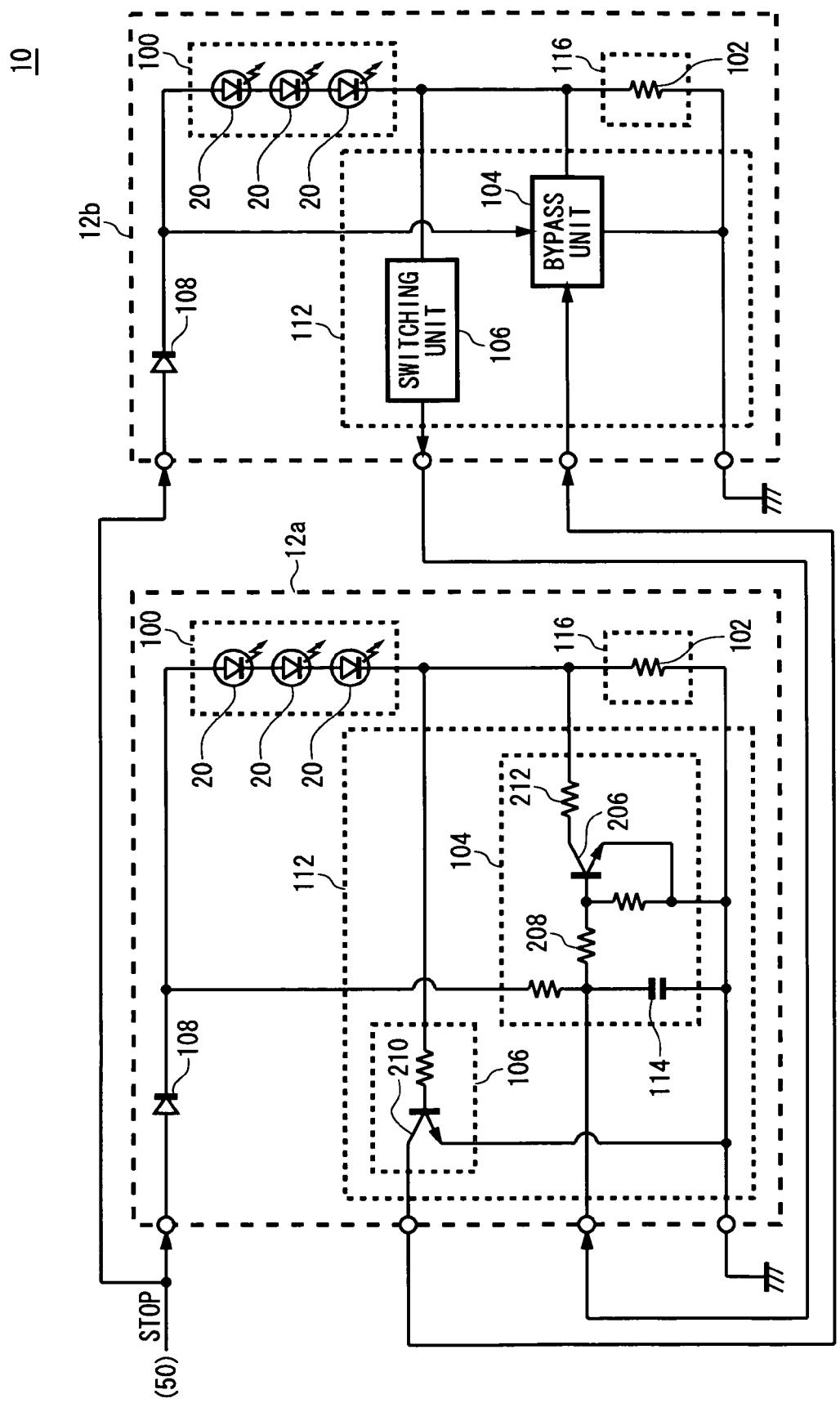
FIG. 2 is a circuit diagram illustrating a part of a circuit configuration of the vehicular lamp 10 according to a first embodiment of the present invention.

FIG. 2 is a circuit diagram illustrating a part of a circuit configuration of the vehicular lamp 10 according to a first embodiment of the present invention. In the present embodiment, the vehicular lamp 10 includes a plurality of marker lamps 12a and 12b which act as a stop lamp. The marker lamp 12a has the same or similar configuration as/to the marker lamp 12b, each of which includes a light source unit 100, a diode 108, a current limiting unit 116, and an electric current control unit 112.

The light source unit 100 includes a plurality of light emitting diodes 20 connected in series. The plurality of light emitting diodes 20 emit light according to electric current supplied from the power supply unit 50 through diode 108 so that the marker lamp 12 operates properly. Alternatively, the light source unit 100 includes single light emitting diode 20, or includes a plurality of light emitting diodes 20 connected in parallel.

In addition, in the present embodiment, the light source units 100 in the plurality of marker lamps 12a and 12 are connected in parallel with each other and in series with the power supply unit 50. Therefore, the vehicular lamp 10 includes a plurality of light emitting diodes 20 connected in parallel. Moreover, the diode 108 and the light source unit 100 are connected in series and in the same direction to protect the light source unit 100 against reverse connection of the power supply.

The current limiting unit 116 is provided corresponding to the light source unit 100 in each of the marker lamps 12a and 12b, and connects with the light emitting diodes 20 of the corresponding light source unit 100 in series. In the present embodiment, the current limiting unit 116 includes a resistor 102. The resistor 102 is an example of a series resistance connected in series with the light source unit 100, and limits electric current flowing through the light source unit 100 by grounding a terminal of the resistor 102 opposite to the other terminal connecting with the light source unit 100. Thereby, the current limiting unit 116 limits the electric current flowing through the light emitting diodes 20. Alternatively, a plurality of current limiting units 116 is provided corresponding to a plurality of light emitting diodes 20 connected in parallel, respectively.

The current control unit 112 includes a switching unit 106 and a bypass unit 104. The switching unit of the marker lamp 12a connects with the bypass unit 104 of the marker lamp 12b, and the switching unit of the marker lamp 12b connects with the bypass unit 104 of the marker lamp 12a through terminals provided in the marker lamps 12a and 12b. The switching unit 106 includes an NPN transistor 210 and a resistor. The base terminal of the NPN transistor 210 connects with a node between the light source unit 100 and the current limiting unit 116 via the resistor. Therefore, when the electric current flowing through the light source unit 100 decreases, the voltage of this node also decreases and the NPN transistor 210 is turned OFF. Thereby, the NPN transistor 210 detects wire breakage of the light source unit 100.

Moreover, the collect or terminal of the NPN transistor 210 of the marker lamp 12a or 12b connects with the bypass unit 104 of the other marker lamp 12b or 12a. In the present embodiment, the NPN transistor 210 opens the collector terminal when wire breakage is detected, and it sinks the collector current when wire breakage is not detected. Thereby, the NPN transistor 210 of the marker lamp 12a or 12b informs the bypass unit 104 in the other marker lamp 12b or 12a about the existence of the wire breakage of the light source unit 100 in the marker lamp 12a or 12b.

Consequently, the switching unit 106 in the marker lamp 12a or 12b detects the wire breakage of the light source unit 100 in the marker lamp 12a or 12b. Then, the switching unit 106 controls the bypass unit 104 in the other marker lamp 12b or 12a based on the result of the detection. For example, the switching unit 106 in the marker lamp 12a controls the bypass unit 104 in the marker lamp 12b.

In the present embodiment, the switching units 106 are provided in the marker lamps 12a and 12b respectively, the switching units 106 corresponding to the plurality of light source units 100 connected in parallel, respectively. Thereby, the switching units 106 detect the wire breakage in each of the plurality of light emitting diodes 20 connected in parallel.

The bypass unit 104 includes a capacitor 114, an NPN transistor 206, and a plurality of resistors. The input to the bypass unit is smoothed by the capacitor 114 and is supplied to the NPN transistor 206 through the resistor 208.

The NPN transistor 206 is an example of a switch connected in series with the light emitting diodes 20, and in parallel with the resistor 102. The collector terminal of the NPN transistor 206 connects with the non-grounded terminal of the current limiting unit 116 via the resistor 212, and the emitter terminal of the NPN transistor 206 connects with the grounded terminal of the current limiting unit 116. Moreover, the base terminal of the NPN transistor 206 in the marker lamp 12a or 12b connects with the switching unit 106 in the other marker lamp 12b or 12a via the resistor 208.

The output of the switching unit 106 is pulled up by a resistor in the bypass unit 104, and the base terminal of the NPN transistor 206 receives the pulled-up output via the resistor 208. Moreover, the base terminal is pulled down by a resistor. Therefore, when the switching unit 106 in the marker lamp 12a or 12b detects wire breakage of the light source unit 100 in the other marker lamp 12b or 12a, the NPN transistor 206 is turned ON, whereby the NPN transistor 206 electrically connects the both terminals of the current limiting unit 116 through the resistor 212. In this case, the NPN transistor 206 increases electric current to be supplied to the light source unit 100 by supplying a part of the electric current supplied to the corresponding light source unit 100 via a path connected in parallel with the current limiting unit 116. Thereby, the bypass unit 104 of the marker lamp 12*a* or 12*b* bypasses a part of the electric current in response to the wire breakage of the light source unit 100 in the other marker lamp 12*b* or 12*a*.

In addition, the wire of each of the light source units 100 is considered to be broken when the wire of at least one of the plurality of light emitting diodes 20 in the light source unit 100 connected in series is broken. Therefore, when the wire of at least one of the light emitting diodes 20 is broken, at least a part of the electric current to be supplied to the light emitting diodes 20 of which the wire are not broken flows through the path connected in parallel with the current limiting unit 116. Thereby, the current control unit 112 increases the electric current to be supplied to the light emitting diodes 20.

According to the vehicular lamp 10 explained hereinbefore, when the light source unit 100 in either the marker lamp 12*a* or 12*b* is broken, the current control unit 112 increases the electric current to be supplied to the light source unit 100 in the other marker lamp 12*b* or 12*a*, and increases quantity of light of the light source unit 100 in the other marker lamp 12*b* or 12*a*. In this case, even if the light source unit 100 in either the marker lamp 12*a* or 12*b* is broken, the total quantity of light of the vehicular lamp 10 can be maintained properly, and visibility of the vehicular lamp 10 can be maintained properly. According to the present embodiment, the safety requirement of the vehicular lamp 10 can be appropriately satisfied. Moreover, according to the present embodiment, the vehicular lamp 10 can be operated appropriately.

In addition, resistance of the resistor 212 is 2.5 times as high as that of the resistor 102 in the present embodiment. In this case, when one of the light emitting diodes 20 in the other marker lamp 12*b* or 12*a* is broken, the current control unit 112 increases the electric current to be supplied to the light source unit 100 in the marker lamp 12*a* or 12*b* by about 1.4 times of the normal condition. It is preferable that the current control unit 112 changes the electric current to be supplied to the light source unit 100 within the rated current of the light emitting diodes 20. During the normal condition, the current limiting unit 116 may limit the electric current to be supplied to the light source unit 100 to about 60 to 70 percents of the rating of the light emitting diodes 20.

Moreover, in the present embodiment, the switching unit 106 opens the output when wire breakage is detected. Therefore, according to the present embodiment, when there is a poor connection at an input terminal of either the marker lamp 12*a* or 12*b*, the bypass unit 104 in the other marker lamp 12*b* or 12*a* receives information as is the case with the wire breakage, and increases the electric current to be supplied to the light source unit 100 of the marker lamp 12*a* or 12*b*. Therefore, according to the present embodiment, even in the case that there occurs a poor connection at the input terminal, the quantity of light of the vehicular lamp 10 can be maintained properly.

For example, the diode 108, the current limiting unit 116, and the current control unit 112 are provided in the circuit unit 18 (refer to FIG. 1). The circuit unit 18 to be included in the marker lamp 12*a* is identical to that of the marker lamp 12*b*. In this case, substrate assembly on which electronic parts of the marker lamp are mounted can be commonized.

Figure 3:
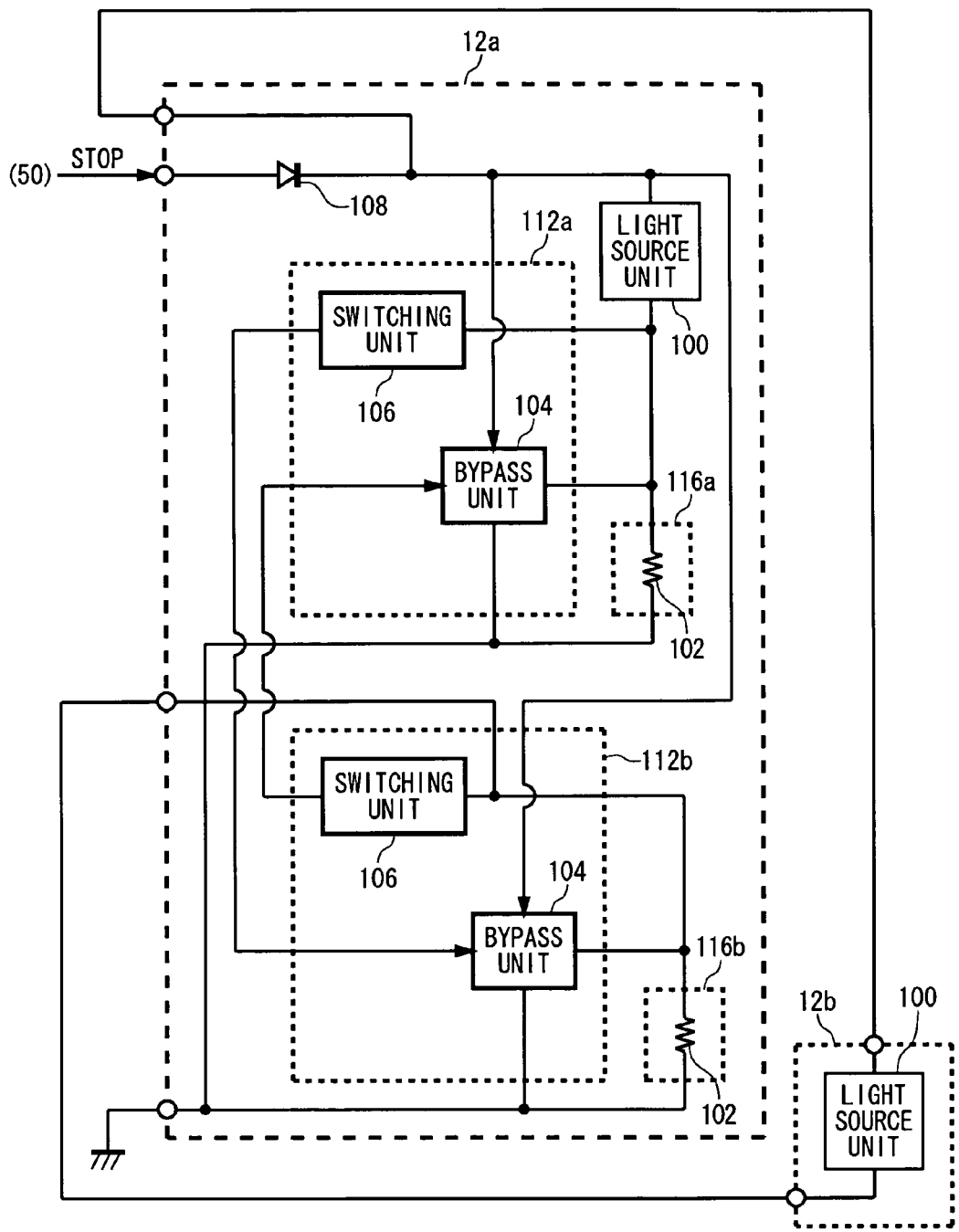
FIG. 3 is a circuit diagram illustrating a part of a circuit configuration of the vehicular lamp 10 according to a second embodiment of the present invention.

FIG. 3 is a circuit diagram illustrating a part of a circuit configuration of the vehicular lamp 10 according to a second embodiment of the present invention. In the present embodiment, the marker lamp 12*a* includes a diode 108, a light source unit 100, a plurality of current limiting units 116*a* and 116*b* and a plurality of current control units 112*a* and 112*b*. The marker lamp 12*b* includes a light source unit 100. Since like reference numbers are used to denote like parts in FIG. 2 and FIG. 3, the explanation of those parts will be omitted to avoid redundancy except otherwise described below.

In the present embodiment, the current control unit 112*a* and the current limiting unit 116*a* correspond to the light source unit 100 in the marker lamp 12*a*, and the current control unit 112*b* and the current limiting unit 116*b* corresponds to the light source unit 100 in the marker lamp 12*b*. Functions of the current control unit 112*a* and the current limiting unit 116*a* are the same or similar as/to those of the current control unit 112 and the current limiting unit 116 in the marker lamp 12*a* described in reference to FIG. 2, respectively. Moreover, functions of the current control unit 112*b* and the current limiting unit 116*b* are the same or similar as/to those of the current control unit 112 and the current limiting unit 116 in the marker lamp 12*b* described in reference to FIG. 2, respectively, expect that the current control unit 112*b* and the current limiting unit 116*b* are located in the marker lamp 12*a* although they correspond to the light source 100 in the marker lamp 12*b*.

The light source unit 100 in the marker lamp 12*b* connects with the power supply unit 50 via the diode 108 in the marker lamp 12*a*. Moreover, the light source unit 100 is grounded via the current limiting unit 116*b* in the marker lamp 12*a*. Also in this case, when the wire of either of the light source units 100 is broken, the current control unit 112*a* or 112*b* increases the electric current to be supplied to the corresponding light source unit 100 of which the wire is not broken. Thereby, even if the wire of either of the light source units 100 is broken, the quantity of light of the vehicular lamp 10 can be maintained properly. Therefore, according to the present embodiment, the vehicular lamp 10 can be operated appropriately. Moreover, according to the present embodiment, man-hour of inspection of the marker lamp 12*b* before shipping is reducible by simplifying the configuration of the marker lamp 12*b*. Alternatively, a part of the current control unit 112*b* and/or the current limiting unit 116*b* is located in the marker lamp 12*b*.

Figure 4:
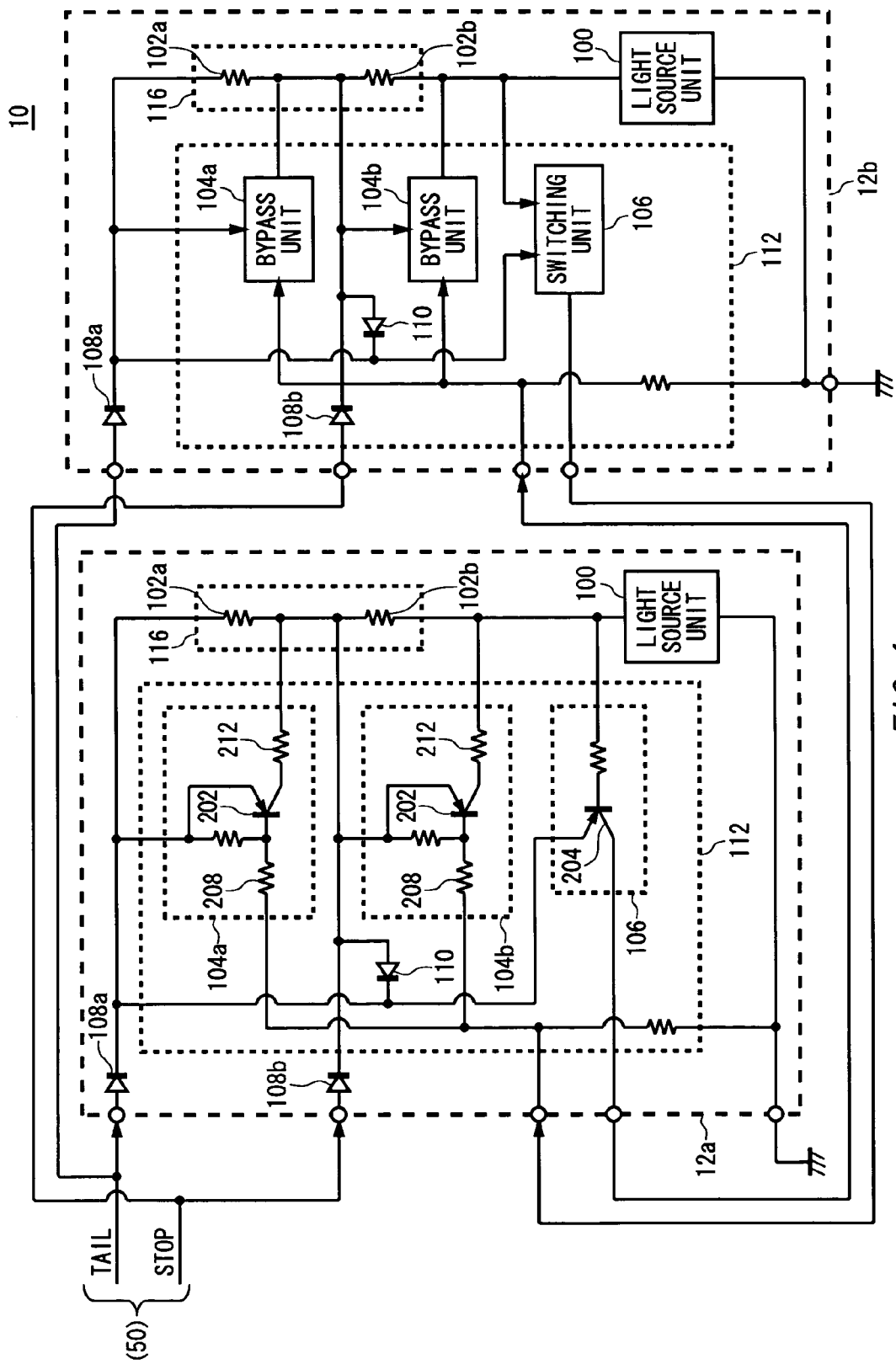
FIG. 4 is a circuit diagram illustrating a part of a circuit configuration of the vehicular lamp 10 according to a third embodiment of the present invention.

FIG. 4 is a circuit diagram illustrating a part of a circuit configuration of the vehicular lamp 10 according to a third embodiment of the present invention. In the present embodiment, the function and configuration of the marker lamp 12*a* is the same or similar as/to those of the marker lamps 12*b*, and the plurality of the marker lamps 12*a* and 12*b* act as at least one of a stop lamp and a tail lamp and are operated depending on an instruction from outside. Since like reference numbers are used to denote like parts in FIG. 2 and FIG. 4, the explanation of those parts will be omitted to avoid redundancy except otherwise described below.

Each of the marker lamps 12*a* and 12*b* includes a light source unit 100, a plurality of diodes 108*a* and 108*b*, a current limiting unit 116, and a current control unit 112. When the vehicular lamp 10 acts as a tail lamp, each of the marker lamps 12*a* and 12*b* receives positive voltage from the power supply unit 50 provided in the exterior of the marker lamps 12*a* and 12*b* via the respective diode 108*a*. Moreover, when the vehicular lamp 10 acts as a stop lamp, each of the marker lamps 12*a* and 12*b* receives positive voltage from the power supply unit 50 via the respective diode 108*b*.

The current limiting unit 116 in each of the marker lamps 12*a* and 12*b* includes a plurality of resistors 102*a* and 102*b* located upstream of the light source unit 100 with respect to the current flow direction and corresponding to the light source unit 100 in the respective marker lamp 12*a* or 12*b*. The resistors 102*a* and 102*b* are examples of a first series resistance and a second series resistance, respectively. In the present embodiment, a high voltage side of the resistor 102a connects with the diode 108a, and a low voltage side of the resistor 102a connects with a high-voltage side of the resistor 102b. Moreover, the high voltage side of the resistor 102b connects with the diode 108b, and a low voltage side of the resistor 102b connects with the light source unit 100. Thereby, the plurality of resistors 102a and 102b are connected in series, and they also connect with the light source unit 100 in series.

Therefore, when the marker lamps 12a and 12b act as a stop lamp, each of the light source units 100 receives electric power from the power supply unit 50 via the resistor 102b and the diode 108b. In this case, at least a part of the electric current to be supplied to the light source unit 100 flows through the resistor 102b. Moreover, when the marker lamps 12a and 12b act as a tail lamp, each of the light source units 100 receives electric power from the power supply unit 50 via the resistors 102a and 102b and the diode 108a. In this case, at least a part of the electric current to be supplied to the light source unit 100 flows through the resistors 102a and 102b.

The current control unit 112 includes a switching unit 106, a diode 110 and a plurality of bypass units 104a and 104b. The switching unit 106 in each of the marker lamp 12a and 12b includes a PNP transistor 204 and a resistor, detects wire breakage of the light source unit 100 based on a voltage of a low voltage side of the current limiting unit 116, and informs the bypass units 104a and 104b in the other marker lamp 12b or 12a about the existence of the wire breakage of the light source unit 100 in the marker lamp 12a or 12b.

In the present embodiment, the emitter terminal of the PNP transistor 204 receives a positive voltage output from the power supply unit 50 via the diode 108a when the vehicular lamp 10 acts as a tail lamp, and via the diode 110 and the diode 108b when the vehicular lamp 10 acts as a stop lamp. When the wire breakage of the corresponding light source unit 100 is not detected, the collector current does not flow through the PNP transistor 204, and when the wire breakage of the corresponding light source unit 100 is detected, the PNP transistor sources the collector current to the bypass units 104a and 104b of the other marker lamp 12b or 12a according to the positive voltage. Thereby, the PNP transistor 204 informs the bypass units 104a and 104b in the other marker lamps 12b or 12a about the existence of the wire breakage of the corresponding light source unit 100 in the marker lamp 12a or 12b.

The diode 110 is directed so that electric current flows from a cathode of the diode 108b to a cathode of the diode 108a. Thereby, the diode 110 prevents to connect the diode 108a directly with the high voltage side of the resistor 102b without the resistor 102a.

The plurality of bypass units 104a and 104b are provided corresponding to the plurality of resistors 102a and 102b, respectively, each of which includes a PNP transistor 202 and a plurality of resistors. The collector terminals of the PNP transistors 202 connect with low voltage side of the resistors 102a and 102b, respectively, via the respective resistor 212, and the emitter terminals of the PNP transistors 202 connect with the high voltage side of the resistors 102a and 102b, respectively. Therefore, each of the PNP transistors 202 electrically connects the both terminals of the respective resistor 102a or 102b through the respective resistor 212 when it is turned ON, thereby each of the PNP transistors 202 increases the electric current to be supplied to the light source unit 100. For example, resistance of the resistor 212 is substantially 2.5 times as high as that of the corresponding current control unit 112.

The base terminal of the PNP transistor 202 in the marker lamp 12a or 12b receives the output of the switching unit 106 in the other marker lamp 12b or 12a through a resistor. Moreover, the output of the switching unit 106 is pulled down by the resistor in the current control unit 112, and the base terminal of the PNP transistor 202 is pulled up by connecting with the cathode of the respective diode 108a or 108b via a resistor. Therefore, the PNP transistor 202 in the marker lamp 12a or 12b is turned ON when the switching unit 106 in the other marker lamp 12b or 12a detects wire breakage. Thereby, when the wire of one of the light source units 100 is broken, the current control unit 112 increases the electric current to be supplied to the light source unit 100 of which the wire is not broken. Therefore, also in the present embodiment, the quantity of light of the vehicular lamp 10 can be maintained properly. According to the present embodiment, the vehicular lamp 10 can be operated appropriately.

In addition, the PNP transistor 202 in the bypass unit 104a is an example of a first switch connected with the light source unit 100 in series and with the resistor 102a in parallel. Moreover, the PNP transistor 202 in the bypass unit 104b is an example of a second switch connected with the light source unit 100 in series and with the resistor 102b in parallel. When the wire breakage of either of the light source units 100 is detected, the plurality of switching units 106, which are provided corresponding to the plurality of marker lamps 12a and 12b, may turn ON the PNP transistor 202 in either the bypass unit 104a or 104b corresponding to the light source units 100 of which the wire is not broken. Unless otherwise described above, the function of the PNP transistor 202 described in reference to FIG. 4 is the same or similar as/to that of the NPN transistor 206 described in reference to FIG. 2.

Figure 5:
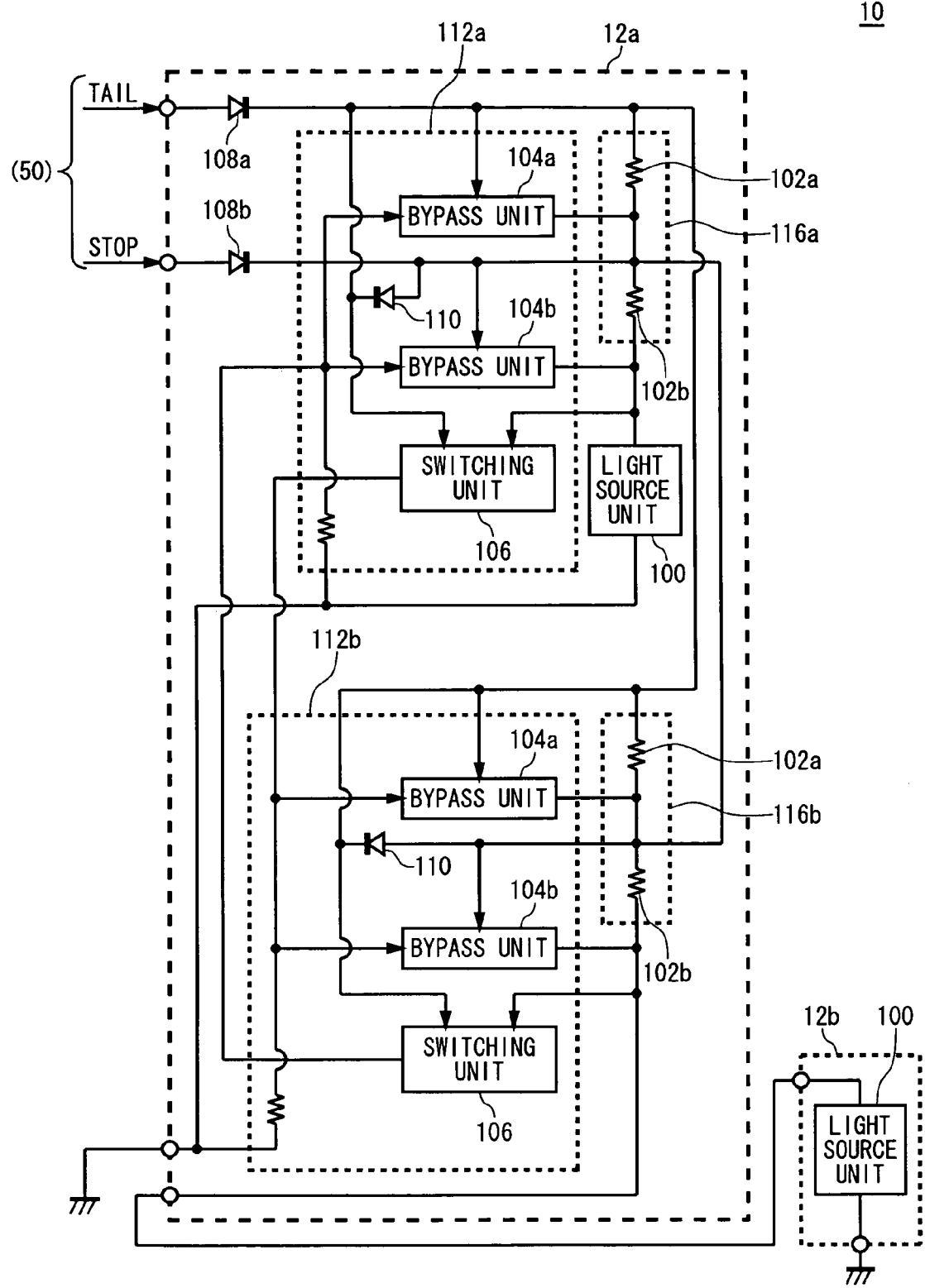
FIG. 5 is a circuit diagram illustrating a part of a circuit configuration of the vehicular lamp 10 according to a fourth embodiment of the present invention.

FIG. 5 is a circuit diagram illustrating a part of a circuit configuration of the vehicular lamp 10 according to a fourth embodiment of the present invention. The marker lamp 12a includes a plurality of diodes 108a and 108b, a light source unit 100, a plurality of current limiting units 116a and 116b, and a plurality of current control units 112a and 112b. The marker lamp 12b includes a light source unit 100. Since like reference numbers are used to denote like parts in FIG. 3, FIG. 4, and FIG. 5, the explanation of those parts will be omitted to avoid redundancy except otherwise described below.

In the present embodiment, the current control unit 112b and the current limiting unit 116b, which correspond to the light source unit 100 in the marker lamp 12b, are provided in the marker lamp 12a. A high voltage side of the light source unit 100 of the marker lamp 12b connects with the current limiting unit 116b through a terminal provided in the marker lamp 12a, and a low voltage side of the light source unit 100 is grounded. The vehicular lamp 10 can be operated appropriately also in the present embodiment. Moreover, according to the present embodiment, as described in the embodiment described in reference to FIG. 3, man-hour of inspection of the marker lamp 12b before shipping is reducible by simplifying the configuration of the marker lamp 12b.

Figure 6:
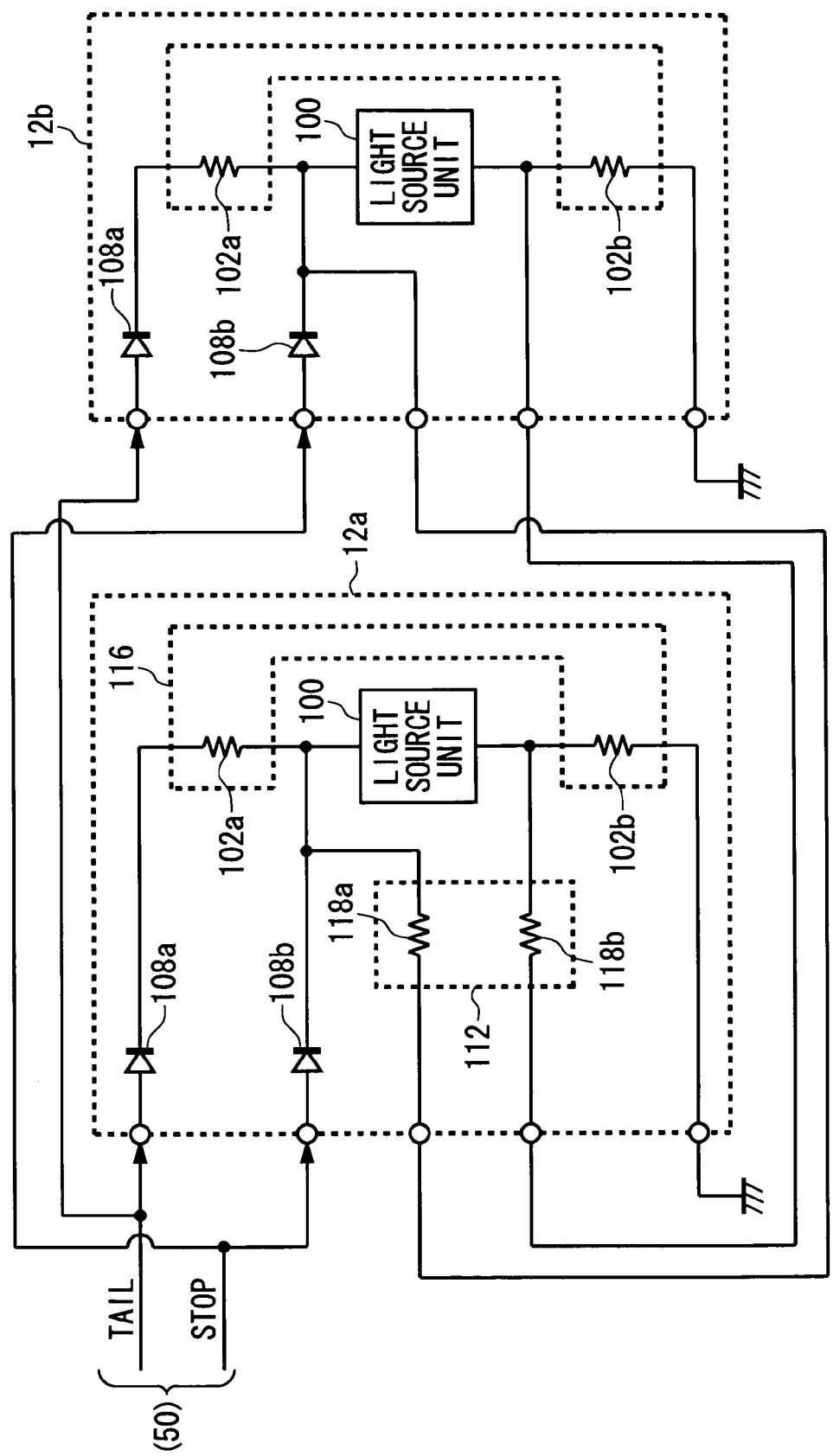
FIG. 6 is a circuit diagram illustrating a part of a circuit configuration of the vehicular lamp 10 according to a fifth embodiment of the present invention.

FIG. 6 is a circuit diagram illustrating a part of a circuit configuration of the vehicular lamp 10 according to a fifth embodiment of the present invention. In the present embodiment, a plurality of marker lamps 12a and 12b act as at least one of a stop lamp and a tail lamp depending on an instruction from outside. The marker lamp 12a includes a light source unit 100, a plurality of diodes 108a and 108b, a current limiting unit 116, and a current control unit 112.

The marker lamp 12b includes a light source unit 100, a plurality of diodes 108a and 108b, and a current limiting unit 116. Since like reference numbers are used to denote like parts in FIG. 4 and FIG. 6, the explanation of those parts will be omitted to avoid redundancy except otherwise described below.

The current limiting unit 116 includes a plurality of resistors 102a and 102b. In the present embodiment, the resistor 102a connects with a high voltage side of the light source unit 100 and the diode 108a. Moreover, a low voltage side of the light source unit 100 is grounded via the resistor 102b. The resistors 102a and 102b bare examples of a first series resistance and a second series resistance, respectively, which are connected in series. The series resistances connect with the light emitting diodes 20 (refer to FIG. 2) in the corresponding light source unit 100 in series, so that at least a part of the electric current to be supplied to the light emitting diodes 20 flows through the series resistances.

When the vehicular lamp 10 acts as a stop lamp, a positive voltage from the power supply unit 50 is supplied to an anode of the light emitting diodes 20 via the diode 108b, and a cathode of the light emitting diodes 20 is grounded via the resistor 102b. Thereby, the electric power from the power supply unit 50 is supplied to the light emitting diodes 20 via the resistor 102b, which is one of the series resistances. When the vehicular lamp 10 acts as a tail lamp, the electric power from the power supply unit 50 is supplied to the light emitting diodes 20 via the resistors 102a and 102b, which are both of the series resistances.

The current control unit 112 includes a plurality of resistors 118a and 118b. The plurality of resistors 118a and 118b are examples of a first and a second terminal connecting units respectively, where the first and second terminal connecting units are provided corresponding to the resistors 102a and 102b, respectively. The resistor 118a electrically connects a node between the resistor 102a and the light source unit 100 in the marker lamp 12a and a node between the resistor 102a and the light source unit 100 in the marker lamp 12b. The resistor 118b electrically connects a node between the resistor 102b and the light source unit 100 in the marker lamp 12a and a node between the resistor 102b and the light source unit 100 in the marker lamp 12b. That is, each of the plurality of resistors 118a and 118b connects nodes between the light emitting diodes 20 and the respective resistors 102a or 102b in the marker lamps 12a and 12b.

Therefore, when all wires of both of the light source units 100 are connected properly, voltage of one terminal of each of the resistors 118a and 118b is substantially the same as voltage of the other terminal of each of the resistors 118a and 118b, respectively, because the voltage of the corresponding nodes in the marker lamps 12a and 12b are substantially the same as each other (e.g., the voltage of the node between the resistance 102a and the light source unit 100 in the marker lamp 12a is substantially the same as the voltage of the node between the resistance 102a and the light source unit 100 in the marker lamp 12b). Therefore, electric current does not flow through the resistor 118a or 118b. In this case, the electric current to be supplied to the light source unit 100 is determined by the resistance of the plurality of resistors 102a and 102b, and the light source unit 100 emits light according to the supplied electric current.

On the other hand, when the vehicular lamp 10 acts as a tail lamp, and when the wire of the light source unit 100 in one of the marker lamps 12a and 12b is broken, since electric current does not flow through the light source unit 100 of which the wire is broken, the electric current does not flow through the resistors 102a or 102b corresponding to the wire-broken light source unit 100. Thereby, the voltage of the node between the resistance 102a and the light source unit 100 increases while the voltage of the node between the resistance 102b and the light source unit 100 decreases. Therefore, electric current flows from the node between the resistance 102a and the light source unit 100 of which the wire is broken to the node between the resistance 102a and the other light source unit 100 of which the wire is not broken, and electric current flows from the node between the resistance 102b and the other light source unit 100 of which the wire is not broken to the node between the resistance 102b and the light source unit 100 of which the wire is broken. In this case, the electric current flows through the light source unit 100 of which the wire is not broken via not only the corresponding current limiting unit 116 but also via the resistors 118a and 118b.

Thereby, when the wire of one of the light source units 100 is broken, the current control unit 112 increases the electric current to be supplied to the light source unit 100 of which the wire is not broken. Therefore, also in the present embodiment, the quantity of light of the vehicular lamp 10 can be maintained properly. According to the present embodiment, the vehicular lamp 10 can be operated appropriately.

Moreover, when the vehicular lamp 10 acts as a stop lamp, since each of the light source units 100 receives electric current from the respective diode 108b, and the voltage of a node between the diode 108b and the light source unit 100 in the marker lamp 12a is substantially the same as the voltage of a node between the diode 108b and the light source unit 100 in the marker lamp 12b, electric current does not flow through the resistor 118a regardless whether the wire of the light source unit 100 is broken or not. In this case, when the wire of one of the light source units 100 is broken, the current control unit 112 increases the electric current to be supplied to the light source unit 100 of which the wire is not broken via the resistor 118b. Also in this case, the vehicular lamp 10 can be operated appropriately.

In addition, in the present embodiment, resistance of the resistor 118a is substantially 1.5 times as high as that of the resistor 102a, and resistance of the resistor 118b is substantially 1.5 times as high as that of the resistor 102b. In this case, when the wire of one of the light source units 100 is broken, the current control unit 112 increases the electric current to be supplied to the light source unit 100 of which the wire is not broken by about 1.4 times of the normal condition. Alternatively, each of the marker lamps 12a and 12b omits the diode 108a and the resistor 102a. In this case, the marker lamps 12a and 12b act as a stop lamp.

Figure 7:
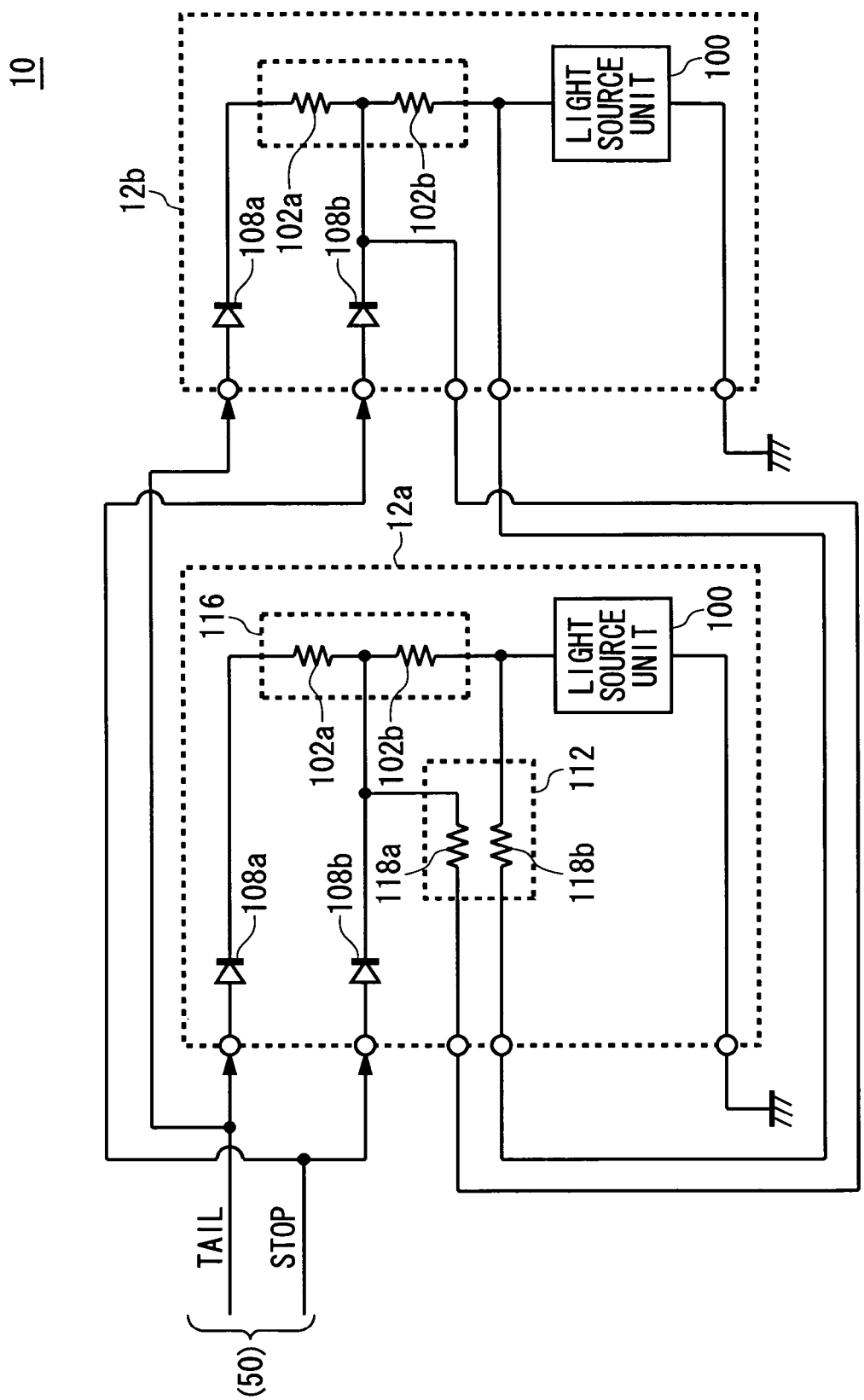
FIG. 7 is a circuit diagram illustrating a part of a circuit configuration of the vehicular lamp 10 according to a sixth embodiment of the present invention.

FIG. 7 is a circuit diagram illustrating a part of a circuit configuration of the vehicular lamp 10 according to a sixth embodiment of the present invention. Since like reference numbers are used to denote like parts in FIG. 6 and FIG. 7, the explanation of those parts will be omitted to avoid redundancy except otherwise described below.

In the present embodiment, the current limiting unit 116 includes a plurality of resistors 102a and 102b located upstream of the light source unit 100 with respect to the current flow direction. The resistor 102a connects the diode 108a and a high voltage side of the resistor 102b, and the resistor 102b connects the diode 108b and a high voltage side of the light source unit 100. Also in this case, when the wire of the one of the light source units 100 is broken, the current control unit 112 increases the electric current to be supplied to the light source unit 100 of which the wire is not broken according to the electric current flowing through the resistor 118a and/or the resistor 118b. Therefore, also in the present embodiment, the quantity of light of the vehicular lamp 10 can be maintained properly. According to the present embodiment, the vehicular lamp 10 can be operated appropriately.

Figure 8:
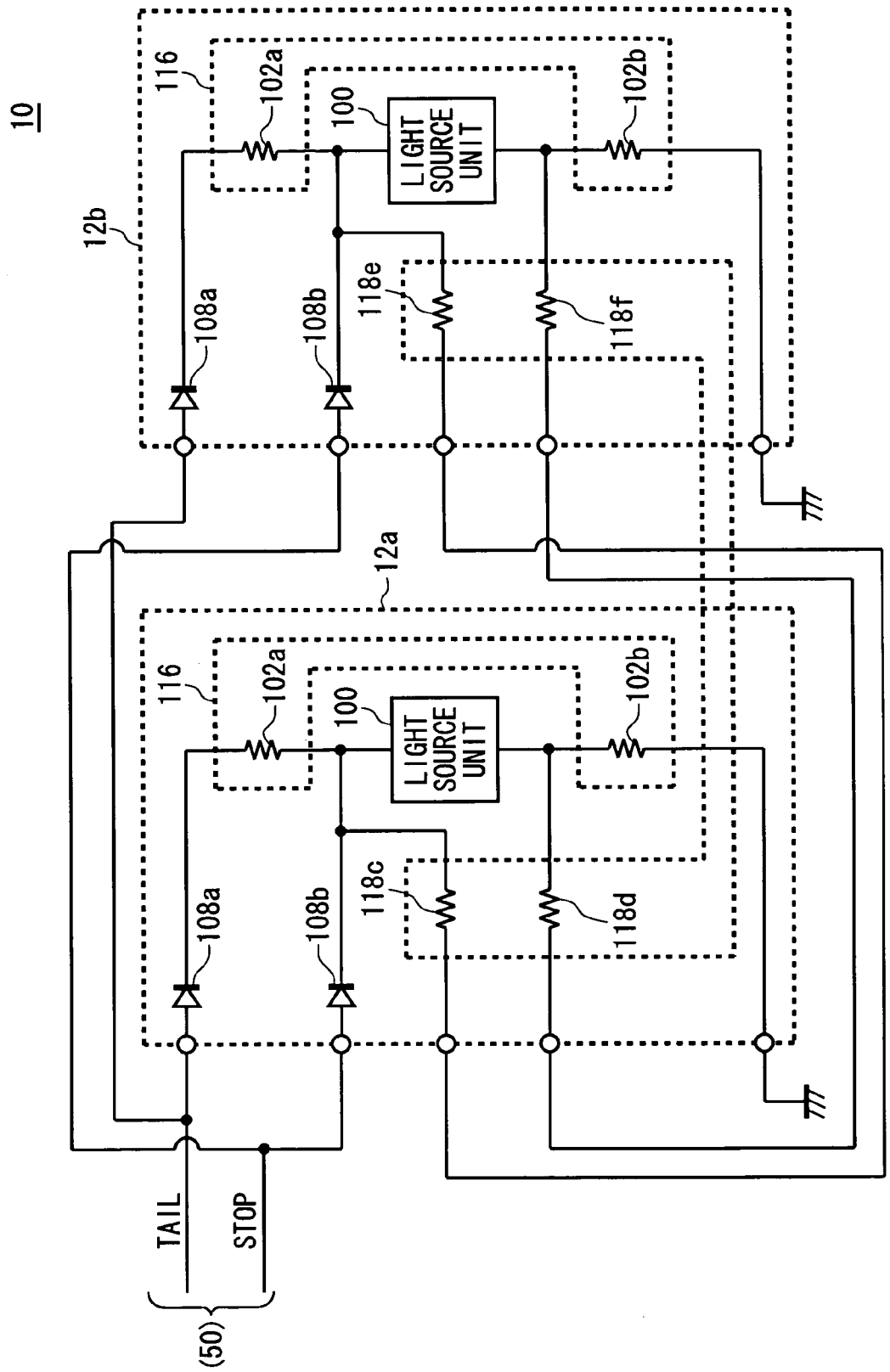
FIG. 8 is a circuit diagram illustrating a part of a circuit configuration of the vehicular lamp 10 according to a seventh embodiment of the present invention.

FIG. 8 is a circuit diagram illustrating a part of a circuit configuration of the vehicular lamp 10 according to a seventh embodiment of the present invention. Since like reference numbers are used to denote like parts in FIG. 6 and FIG. 8, the explanation of those parts will be omitted to avoid redundancy except otherwise described below.

In the present embodiment, the vehicular lamp 10 includes a plurality of resistors 118c and 118e instead of the resistor 118a explained in reference to FIG. 6, and includes a plurality of resistors 118d and 118f instead of the resistor 118b explained in reference to FIG. 6. In the present embodiment, the plurality of resistors 118c–118f constitutes a current control unit 112. The resistors 118c and 118d are provided in the marker lamp 12a, and the resistors 118e and 118f are provided in the marker lamp 12b.

Resistance of each of the resistors 118c and 118e is about half of the resistance of the resistor 118a, and the resistors 118c and 118e are connected in series and connect a terminal of the resistor 102a in the marker lamp 12a and a terminal of the resistor 102a in the marker lamp 12b in a similar manner to what the resistor 118a connects the two terminals according to other embodiments. Resistance of each of the resistors 118d and 118f is about half of the resistance of the resistor 118b, and the resistors 118d and 118f connect with each other in series and connect a terminal of the resistor 102b in the marker lamp 12a and a terminal of the resistor 102b in the marker lamp 12b in a similar manner to what the resistor 118b connects the two terminals according to other embodiments.

Also in this case, when the wire of the light source unit 100 in one of the marker lamps 12a and 12b is broken, the current control unit 112 increases the electric current to be supplied to the light source unit 100 of which the wire is not broken. Therefore, also in the present embodiment, the quantity of light of the vehicular lamp 10 can be maintained properly. According to the present embodiment, the vehicular lamp 10 can be operated appropriately. Moreover, in the present embodiment, the circuit configuration of the marker lamp 12a is the same as that of the marker lamp 12b. Therefore, according to the present embodiment, the cost of the vehicular lamp 10 is reducible by commonizing the substrate assembly of the marker lamps 12a and 12b, for example.

In addition, in the present embodiment, the resistors 118c–118f are examples of connection resistors. In this case, the resistors 118c and 118e constitute a first terminal connecting unit, and the resistors 118d and 118f constitute a second terminal connecting unit, for example.

Moreover, the resistors 118c and 118d are accommodated in the lamp body 14 (refer to FIG. 1) of the marker lamp 12a, and the resistors 118e and f are accommodated in the lamp body 14 of the marker lamp 12b. Moreover, the resistors 118c and 118e are connected in series and electrically connects the terminals of the resistors 102a accommodated in the different lamp bodies 14. Moreover, the resistors 118d and 118f are connected in series and electrically connects the terminals of the resistors 102b accommodated in the different lamp bodies 14. Each of the lamp bodies 14 may accommodate a set of the light emitting diodes 20 (refer to FIG. 1) and the resistors 102a and 102b corresponding to the set of the light emitting diodes 20 to protect them from water.

Figure 9:
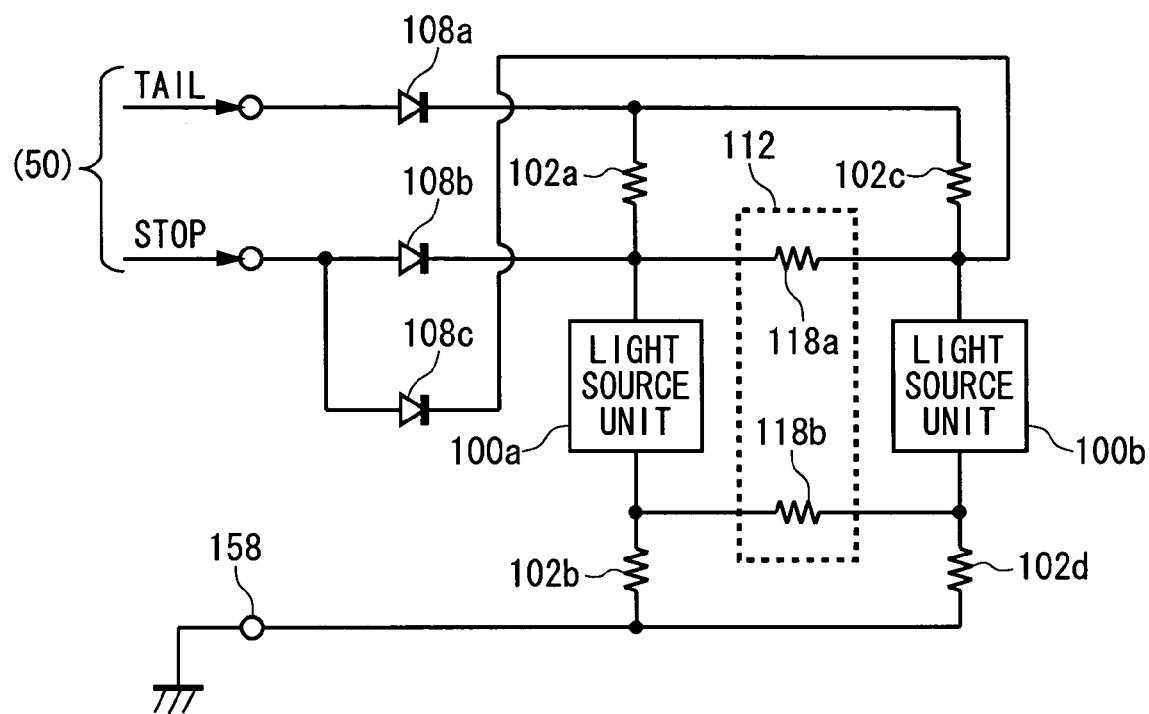
FIG. 9 is a circuit diagram illustrating a configuration of a marker lamp.

FIG. 9 is a circuit diagram illustrating a configuration of a marker lamp 12. In the present embodiment, the marker lamp 12 includes a plurality of diodes 108a–108c, a plurality of light source units 100a and 100b, a plurality of resistors 102a–102d, and a current control unit 112.

In the present embodiment, a plurality of light source units 100a and 100b, which are connected in parallel, are provided in single marker lamp 12. In this case, the vehicular lamp 10 (refer to FIG. 1) includes the single marker lamp 12. Moreover, the resistors 102a and 102b are examples of series resistances connected with the light source unit 100a in series, and the resistors 102c and 102d are examples of series resistances connected with the light source unit 100b in series. A high voltage side of the light source unit 100a connects with the diode 108a via the resistor 102a, and a low voltage side of the light source unit 100a is grounded via the resistor 102b. A high voltage side of the light source unit 100b connects with the diode 108a via the resistor 102c, and a low voltage side of the light source unit 100b is grounded via the resistor 102d. Moreover, the high voltage side of the light source units 100a and 100b connect with the diodes 108b and 108c, respectively, wherein the diodes 108b and 108c are connected in parallel.

Therefore, when the vehicular lamp 10 acts as a tail lamp, the light source unit 100a receives a positive voltage output from the power supply unit 50 via the resistor 102a and the diode 108a, and the light source unit 100b receives the positive voltage via the resistor 102c and the diode 108a. On the other hand, when the vehicular lamp 10 acts as a stop lamp, the light source units 100a and 100b receive a positive voltage output from the power supply unit 50 via the diodes 108b and 108c, respectively.

The current control unit 112 includes resistors 118a and 118b. The resistor 118a connects a high voltage side of the light source unit 100a and a high voltage side of the light source unit 100b. The resistor 118b connects a low voltage side of the light source unit 100b and a low voltage side of the light source unit 100b.

Therefore, when the wire of one of the light source units 100a and 100b is broken, electric current flows from the high voltage side of the light source unit 100a or 100b of which the wire is broken to the high voltage side of the light source unit 100b or 100a of which the wire is not broken via the resistor 118a. Moreover, the electric current flows from the low voltage side of the light source unit 100b or 100a of which the wire is not broken to the lower voltage side of the light source unit 100a or 100b of which the wire is broken via the resistor 118b. Thereby, the current control unit 112 increases the electric current to be supplied to the light source unit 100b or 100a of which the wire is not broken. Therefore, according to the present embodiment, even if the wire of one of the light source units 100a or 100b is broken, the quantity of light of the vehicular lamp 10 can be maintained properly. According to the present embodiment, the vehicular lamp 10 can be operated appropriately.

The vehicular lamp to which the present invention may be applied to includes, but not limited to, headlamp, tail lamp, back-up lamp and turn-signal lamp of automobiles, motorcycles and trains, and the headlamp includes but not limited to regular headlamp, fog lamp and cornering lamp.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

As is obvious from the description above, according to the present invention, the quantity of light of the vehicular lamp can always be maintained properly and also the vehicular lamp can be operated appropriately.

What is claimed is:

1. A vehicular lamp, comprising:
a plurality of semiconductor light emitting devices connected in parallel;
a plurality of current limiting units provided corresponding to said plurality of semiconductor light emitting devices, wherein said plurality of current limiting units connect with said corresponding semiconductor light emitting devices respectively in series, and limit electric current flowing through said corresponding semiconductor light emitting devices respectively; and
a current control unit for changing electric current to be supplied to at least one of said plurality of semiconductor light emitting devices; wherein
when a wire of one of said plurality of semiconductor light emitting devices is broken, said current control unit increases the electric current to be supplied to at least one of said plurality of semiconductor light emitting devices of which a wire is not broken by causing at least a part of the electric current to flow via a path connected in parallel with corresponding one(s) of said plurality of current limiting units, wherein
said plurality of current limiting units comprise a plurality of series resistances respectively connecting with said plurality of semiconductor light emitting devices in series so that at least a part of the electric current to be supplied to each of said plurality of semiconductor light emitting devices flows through corresponding one of said plurality of series resistances,
each of said plurality of series resistances comprises a terminal located closest to corresponding one of said plurality of semiconductor light emitting devices,
said current control unit comprises a terminal connecting unit connecting said plurality of terminals with one another.

2. The vehicle lamp as claimed in claim 1, wherein said current control unit comprises:
a plurality of switches respectively connecting with said plurality of current limiting units in parallel and with said plurality of semiconductor light emitting devices in series, each of said plurality of switches electrically connecting both terminals of corresponding one of said plurality of current limiting units when the switch is turned ON; and
a switching unit for detecting wire breakage of at least one of said plurality of semiconductor light emitting devices, wherein
when said switching unit detects wire breakage of one of said plurality of semiconductor light emitting devices, said switching unit turns ON at least one of said plurality of switches corresponding to at least one of said plurality of semiconductor light emitting devices of which a wire is not broken.

3. The vehicular lamp as claimed in claim 2, wherein each of said plurality of switch comprises a transistor, a collector terminal and an emitter terminal of said transistor connecting with both terminals of corresponding one of said plurality of current limiting units, respectively.

4. The vehicular lamp as claimed in claim 2, wherein electric resistance of one of said plurality of switches is higher than that of corresponding one of said plurality of current limiting units.

5. The vehicular lamp as claimed in claim 4, wherein the electric resistance of said one of said plurality of switches is substantially 2.5 times as high as that of corresponding one of said plurality of current limiting units.

6. The vehicular lamp as claimed in claim 1, further comprising
a plurality of lamp bodies accommodating therein said plurality of semiconductor light emitting devices and said plurality of series resistances, wherein
each of said plurality of lamp bodies accommodates a part of said plurality of semiconductor light emitting devices and corresponding one(s) of said plurality of series resistances, and
said terminal connecting unit comprises a plurality of connection resistors connected in series, said plurality of connection resistors being accommodated in said plurality of lamp bodies and electrically connecting said plurality of terminals of said plurality of series resistances.

7. The vehicular lamp as claimed in claim 6, wherein each of said plurality of lamp bodies comprises a circuit unit connecting with at least one of said plurality of semiconductor light emitting devices, said circuit unit comprising a part of said plurality of series resistances.

8. The vehicular lamp as claimed in claim 7, wherein said circuit unit is accommodated inside each one of said plurality of lamp bodies.

9. The vehicular lamp as claimed in claim 7, wherein, said circuit unit further comprises said current control unit.

10. The vehicular lamp as claimed in claim 6, further comprises a circuit unit connecting with said plurality of semiconductor light emitting devices, said circuit unit comprising said plurality of series resistances and said current control unit.

11. The vehicular lamp as claimed in claim 1, wherein
said plurality of series resistances respectively comprise:
a plurality of first series resistances, each of said plurality of first series resistances comprises a first terminal located closest to high voltage side of corresponding one of said plurality of semiconductor light emitting devices; and a plurality of second series resistances, each of said plurality of second series resistances comprises a second terminal located closest to low voltage side corresponding one of said plurality of semiconductor light emitting devices,
said current control unit comprises:
a first terminal connecting unit electrically connecting said plurality of first terminals of said plurality of first series resistances with one another; and
a second terminal connecting unit electrically connecting said plurality of second terminals of said plurality of second series resistances with one another,
the vehicular lamp acts as at least one of a stop lamp and a tail lamp depending on an instruction from outside,
said plurality of light emitting devices receive electric power from outside of the vehicular lamp via either of said first series resistances or said second series resistances when the vehicular lamp acts as a stop lamp, and
said plurality of light emitting devices receive electric power from outside of the vehicular lamp via both of said first series resistances and said second series resistances when the vehicular lamp acts as a tail lamp.

12. The vehicular lamp as claimed in claim 11, wherein electric resistance of said first terminal connecting unit is higher than that of one of said plurality of first series resistances, and electric resistance of said second terminal connecting unit is higher than that of one of said plurality of second series resistances.

13. The vehicular lamp as claimed in claim 12, wherein the electric resistance of said first terminal connecting unit is substantially 1.5 times as high as that of said one of said plurality of first series resistance, and
the electric resistance of said second terminal connecting unit is substantially 1.5 times as high as that of said one of said plurality of second series resistance.

14. A vehicular lamp, comprising:
a plurality of semiconductor light emitting devices connected in parallel;
a plurality of current limiting units provided corresponding to said plurality of semiconductor light emitting devices, wherein said plurality of current limiting units connect with said corresponding semiconductor light emitting devices respectively in series, and limit electric current flowing through said corresponding semiconductor light emitting devices respectively; and
a current control unit for changing electric current to be supplied to at least one of said plurality of semiconductor light emitting devices; wherein
when a wire of one of said plurality of semiconductor light emitting devices is broken, said current control unit increases the electric current to be supplied to at least one of said plurality of semiconductor light emitting devices of which a wire is not broken by causing at least a part of the electric current to flow via a path connected in parallel with corresponding one(s) of said plurality of current limiting units, wherein
each of said plurality of current limiting units connects with corresponding one of said plurality of semiconductor light emitting devices in series,
each of said plurality of current limiting units includes a first series resistance and a second series resistance connected in series, at least a part of the electric current, which is to be supplied to the corresponding one of said plurality of semiconductor light emitting devices, flowing through at least one of said first series resistance and said second series resistance,
the vehicular lamp acts as at least one of a stop lamp and a tail lamp depending on an instruction from outside,
said plurality of light emitting devices receive electric power from outside of the vehicular lamp via either of said first series resistances or said second series resistances when the vehicular lamp acts as a stop lamp, and
said plurality of light emitting devices receive electric power from outside of the vehicular lamp via both of said first series resistances and said second series resistances when the vehicular lamp acts as a tail lamp,
said current control unit comprises:
a first switch connecting with said first series resistance in parallel and with the corresponding one of said plurality of semiconductor light emitting devices in series, said first switch electrically connecting both terminals of said first series resistance when said first switch is turned ON;
a second switch connecting with said second series resistance in parallel and with the corresponding one of said plurality of semiconductor light emitting devices in series, said second switch electrically connecting both terminals of said second series resistance when said second switch is turned ON; and
a switching unit for detecting wire breakage of at least one of said plurality of semiconductor light emitting devices, wherein
when said switching unit detects wire breakage of one of said plurality of semiconductor light emitting devices, said switching unit turns ON at least one of said first switch and said second switch corresponding to one of said plurality of semiconductor light emitting devices of which a wire is not broken.

15. A vehicular lamp, comprising:
a plurality of semiconductor light emitting devices connected in parallel;
a plurality of current limiting units provided corresponding to said plurality of semiconductor light emitting devices, wherein said plurality of current limiting units connect with said corresponding semiconductor light emitting devices respectively in series, and limit electric current flowing through said corresponding semiconductor light emitting devices respectively; and
a current control unit for changing electric current to be supplied to at least one of said plurality of semiconductor light emitting devices; wherein
when a wire of one of said plurality of semiconductor light emitting devices is broken, said current control unit increases the electric current to be supplied to at least one of said plurality of semiconductor light emitting devices of which a wire is not broken by causing at least a part of the electric current to flow via a path connected in parallel with corresponding one(s) of said plurality of current limiting units, wherein electric current flowing through each of said plurality semiconductor light emitting devices, when no wire of said plurality of semiconductor light emitting devices is broken, is lower than rated electric current of each of said plurality of semiconductor light emitting devices.

16. The vehicular lamp as claimed in claim 15, wherein the electric current flowing through each of said plurality semiconductor light emitting devices, when no wire of said plurality of semiconductor light emitting devices is broken, is 60–70 percent of the rated electric current of each of said plurality of semiconductor light emitting devices.

* * * * *